Nov. 1, 1966  H. C. HARBERS  3,282,601
CARGO VEHICLE WITH LOAD DISTRIBUTING ACCESSORY
Filed Jan. 4, 1965
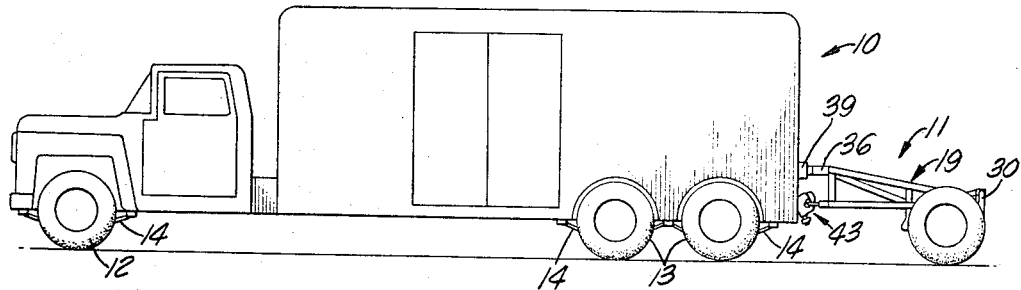
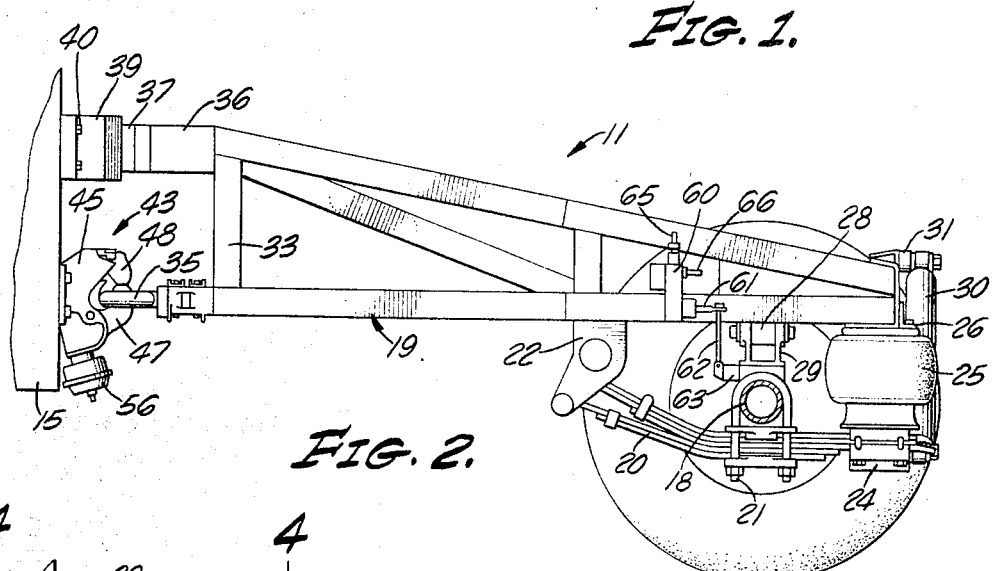
INVENTOR.
HENRY C. HARBERS
BY
ATTORNEY

United States Patent Office 3,282,601
Patented Nov. 1, 1966

3,282,601
CARGO VEHICLE WITH LOAD DISTRIBUTING ACCESSORY
Henry C. Harbers, Pasadena, Calif., assignor to Western Unit Corporation, City of Industry, Calif., a corporation of California
Filed Jan. 4, 1965, Ser. No. 423,047
16 Claims. (Cl. 280—81)

This application relates to cargo vehicles and more particularly to a vehicle of this type equipped with load distributing and sharing means and including means for substantially increasing the wheel base of a given vehicle and its load carrying capabilities.

Rapidly increasing improvements in the design, construction, and operation of cargo vehicles for over-the-highway operation, the ever increasing variety of these vehicles, and their greater load carrying capabilities have posed serious problems in the construction and maintenance of highways. There is a widely recognized need for strict regulation and control as respects the size and design of the chassis to avoid loading the highway in excess of its load bearing capabilities. It is now recognized that limits must be placed on cargo vehicles as respects permissible axle loadings as well as in the spacing between axles inasmuch as both factors play increasing roles in the ability of a given highway construction to support the vehicle under various operating conditions. To cope with these problems designers have proposed various chassis designs and wheel dispositions. Such designs give rise to new families of problems including distribution of power to the different axles to provide adequate traction, suspension problems, braking torque problems, steering problems and others.

An example of a hauling requirement imposing problems in an aggravated form is the transportation of loose material in a dump truck, but it will be understood that there are many equally serious and vexatious hauling problems. For example, in a dump truck the material container must be so located as to permit the container to dump rearwardly of the rear truck wheels. This requirement places a disproportionate load on the rear wheels and less than the desirable and permissible load on the front wheels and thereby limits the load to less than that which the chassis structure is capable of carrying.

By the present invention, there is provided a simple modification applicable to any of a wide variety of cargo vehicles easily and inexpensively incorporated therein for substantially increasing the wheel base and the axle loadings in a highly desirable and beneficial manner. Additionally, the handling characteristics of the vehicle under various loading conditions are greatly benefited, the load carrying ability of the vehicle being increased very substantially without infraction of highway use regulations and without risk of damage to public highways. The invention device comprises a rigid frame supported at one end by an adjustable suspension and carriage assembly and adapted to have its other end pivotally connected to a vehicle chassis cantilever fashion. The adjustable suspension means of the carriage assembly is responsive to a change in loading on the main vehicle to contract or expand and assume a proportionate share of that load while simultaneously redistributing other portions between the vehicle axles. The accessory frame of this cantilever device preferably includes a pivotal connection with the vehicle chassis of appreciable vertical extent centrally of the vehicle end. By reason of this arrangement the auxiliary frame and carriage is free to swing crosswise of the vehicle end while continuing at all times to act as a rigid horizontal extension of the chassis frame.

Accordingly it is a primary object of the present invention to provide a cargo vehicle with an auxiliary load sharing and distributing device projecting from one end of the vehicle and so attached to the vehicle chassis as to form a rigidly acting extension of the vehicle chassis and operating to increase the effective wheel base and load carrying capability of the vehicle.

Another object of the present invention is to provide an auxiliary wheeled attachment designed to be pivotally attached to one end of a vehicle frame to provide a cantilever extension thereof capable of assuming a portion of the vehicle load and to redistribute other portions of the load between the vehicle axles.

Another object of the invention is the provision of a readily connectible and detachable load sharing device for cargo vehicles and including load sensing mechanism and associated means operating automatically to sense changes in load on the vehicle and acting to redistribute such changes between the wheels of the main vehicle and of the auxiliary device.

These and other more specific objects will appear upon reading the following specification and claims and upon considering in connection therewith the attached drawing to which they relate.

Referring now to the drawing in which a preferred embodiment of the invention is illustrated.

FIGURE 1 is a side elevational view of a typical cargo vehicle in association with the invention load distributing and sharing device;

FIGURE 2 is a side elevational view partly in section on an enlarged scale showing the automatic load sensing and adjusting components of the invention;

FIGURE 3 is a fragmentary view with parts broken away and in section illustrating details of the coupling connection between the main vehicle and the load sharing device per se; and FIGURE 4 is a fragmentary cross sectional view taken along line 4—4 on FIGURE 3.

Referring more particularly to FIGURE 1, there is shown one of the many types of cargo vehicles equipped with the invention load distributing device, the cargo vehicle itself being designated generally 10, and the load sharing device generally 11. As here shown vehicle 10 comprises a truck chassis having front wheels 12 and a pair of tandem rear wheels 13, 13 interconnected in known manner by a rigid frame. Each end of the vehicle axles is connected to this rigid frame by a suitable type of suspension means, as for example, by a spring beam 14.

Referring now more particularly to FIGURES 2, 3 and 4, it is pointed out that auxiliary device 11, as here constructed by way of example, comprises a carriage assembly 18 connected to a generally triangular shaped rigid frame 19 by resilient suspension means, such as a pair of spring beams 20 clamped to each end of the carriage axle by clamping means 21. The forward ends of the spring beams are connected to frame 19 through hanger brackets 22. The rear ends of the spring beams 20 project rearwardly from the carriage axle and provide supports for clamping brackets 24 secured to the lower ends of a pair of air bellow springs 25. The upper ends of these bellows are connected to frame 19 by a suitable bracket 26.

Device 11 and particularly the carriage suspension components are likely to be subjected to severe lateral strains particularly while negotiating curves and sharp turns. For this reason it is desirable to include suitable anti-sway means to stabilize the suspension assembly. As here shown this means comprises a stabilizing link 28 having one end pivotally connected to one end of the axle by bracket 29. This sway bar overlies the axle with its inner end pivotally connected to an overlying portion of frame 19 by brackets not shown but corresponding to bracket 29. Normally the anti-sway link 28 lies generally horizontally crosswise of frame 19.

Additional resilient stabilizing and snubbing action is provided by a pair of shock absorbers 30, 30 lying in a vertical plane crosswise of frame 19 with their lower ends diverging outwardly and downwardly to support brackets carried by the rear ends of the respective spring beams 20. The adjacent upper ends of the two shock absorbers are pivotally connected medially of frame 19 by brackets 31.

Frame 19 may be fabricated in any suitable manner from structural steel members, or the like, and typically is of general triangular shape as viewed from the side as well as from the top. In other words, the two triangular side members as viewed in FIGURE 2 converge and merge with one another along the vertically disposed strut member 33. Rigidly secured to the respective lower and upper forward corners of frame 19 are a drawbar hook 35 and a load transmitting member 36. The latter terminates in an upright cylindrical member 37 designed to be journalled in a complementally shaped recess 38 of a thrust bracket 39. Bracket 39 is secured by bolts 40 to the rear end of chassis frame 15 with its center vertically aligned with draft hook 35.

Drawbar hook 35 may be coupled to the vehicle chassis in any suitable manner, as by the power-operated self-coupling hitch assembly designated generally 43 and having the constructional details fully disclosed in United States Letters Patent 3,052,487, granted to Henry C. Harbers et al. September 4, 1962. Assembly 33 includes a main body member 45 secured to chassis frame 15 by bolts 46 and includes a pintle 47 over which hook 35 is engageable. Hook 35 desirably is locked in assembled position by a pivoting jaw member 48 and safety latches 49, 50 functioning to hold jaw 48 open or closed as desired. As an incident of the coupling operation of hook 35 over pintle 47, latch 50 releases jaw 48 for movement to its closed position about jaw pivot pin 51 whereupon locking member 49 latches the jaw in closed position. This latter latch must be manually opened before jaw 48 can be pivoted to its open position about its pivot pin 51. Coupling assembly 43 also preferably includes fluid operated means 53 for elevating hook 35 along pintle 47 so that it can override the upper end of the pintle and be withdrawn therefrom during uncoupling operations. Elevating member 53 is operated by supplying pressurized fluid through conduit 55 to a fluid motor 56 having a linkage connection 57 with member 53.

An important component of the load distributing device is the provision of a conventional type automatic leveling valve 60 rigidly connected with either the chassis of vehicle 10 or with frame 19. Either mode of support is suitable but, as here shown, valve 60 is mounted on frame 19 close to carriage 18. This valve includes a vertically moveable operating lever 61 connected by link 62 and bracket 63 with carriage axle 18. An air supply line 65 extends to a suitable source of pressurized air mounted on the main vehicle. As is well known the outlet end of conduit 65 is normally closed by a valve housed within self-leveling valve 60. However, when the valve is opened by upward pivotal movement of lever 61 away from its normal neutral position it will be understood that pressurized air is supplied through line 66 into air bellows 25. On the other hand if operating lever 61 is moved downwardly from its neutral position, pressurized air present in bellows 25 escapes to the atmosphere via conduit 66 and a vent in valve 60 thereby permitting the bellows partially to collapse until operating lever 61 resumes its neutral position preventing further bleeding of air from the bellows to the atmosphere.

In describing operation of the described cargo vehicle, let it be assumed initially that truck 10 is unloaded. Under these conditions chassis 15 will be supported on its several carriages at a higher elevation than when loaded and air springs 25 will normally support only the weight of the rear end of frame 19. Accordingly, the spacing between the underside of frame 19 and its carriage axle will be at a maximum.

As vehicle 10 is loaded its springs and principally those associated with the tendem rear wheels 13 will deflect downwardly. As chassis frame 15 settles and deflects springs 14 it will obviously carry the attached cantilever frame 19 downwardly along therewith. This action loads spring beams 20 causing these to straighten. In this connection it will be understood that coupling assembly 43 and the overlying thrust bearing 37, 39 do not permit frame 19 to flex vertically relative to truck chassis 15. It follows that the flattening of springs 20 and the associated contraction of the air springs 25 operate through linkage 62 and operating lever 61 of valve 60 to allow pressurized air to flow from conduit 65, through conduit 66 into air springs 25, 25. As this occurs the bellows expand upwardly to lift frame 19. As frame 19 moves upwardly it necessarily lifts the rear end of chassis 15 with it thereby relieving load from rear carriage assemblies 13, 13 and shifting other portions of the load onto front wheels 12. Upward movement of frame 19 and chassis 15 also acts simultaneously to throttle valve 60 and the flow of air to the air springs, the air supply being discontinued as arm 61 returns to its normal neutral position. Under the latter conditions the air present in the air bellows is locked against escape and no additional air may enter until there is a further increase in the load on vehicle 10. If this occurs valve 60 again opens in the same manner just desribed with the result that the increased load is again redistributed partially to carriage wheels of device 11, and partially to front wheels 12, rear truck wheels 13 being relieved of a corresponding portion of the new increase in load.

The loaded vehicle may now be operated over the highway in the usual manner with the load present on the truck being distributed in part to its front wheels, in part to the tandem carriage wheels 13, and the remainder to carriage 18 of load sharing device 11. The latter device acts at all times as a rigid extension of chassis 15 without interference with its limited pivotal movement about a vertical axis passing through the cylindrical thrust bearing and the hitch assembly.

If the load or any part of it is removed from the vehicle, springs 14 are partially relieved of load and tend to elevate the truck body. When this occurs a corresponding change in the vertical relationship between axle 18 and frame 19 occurs with the result that link 62 pivots valve lever 61 downwardly permitting trapped air present in the air springs to escape through conduit 66 to the atmosphere. As this occurs the air springs partially contract thereby reducing the vertical distance between frame 19 and the carriage axle until control lever 61 resumes its normal neutral position.

Device 11 is readily uncoupled from vehicle 10 when not needed, this operation being readily accomplished by first lifting latch 49 and thereafter applying pressurized air to motor 55 which acts through link 56 to rotate member 53 counterclockwise about its pivot. This lifts hook 35 to a height such that it can be withdrawn over the top of pintle hook 47, jaw 48 then being unlocked and free to pivot upwardly about pivot 51. The device is restored to its operating position at the rear of vehicle 10 in the reverse manner. As soon as hook 35 is seated in the arcuate end of member 53, the latter is rotated clockwise by reverse operation of motor 55, and jaw 48 is relocked in its closed position by closure of latch 49.

Although the invention load sharing device has been described in connection with a typical tandem axle truck it will be understood that it is equally advantageous in increasing the load carrying capabilities and operating characteristics of a wide variety of truck designs including both full and semitrailers, cargo trains, two axle vehicles and others. When the device is applied to a semitrailer, superior results are achieved if the fifth wheel is located forwardly of the rear drive wheels of the tractor. When so arranged, the expansion of air bellows 25 acts to shift a portion of the redistributed load to the front wheels of the tractor with generally beneficial results for reasons well known to those skilled in this art.

It is also pointed out that coupling assembly 43 may be replaced by a simple clevis and pin type coupling. In fact a pair of clevises can be used in lieu of assembly 43 and thrust assembly 37, 39. Or even a single clevis suffices if made adequately strong to carry the load forces and if used in combination with a block in place of the eye hook 35. This single coupling connection should have sufficient height and strength to prevent the rear end of frame 19 from pivoting upwardly in a vertical plane as air is admitted to the air springs. If designed to satisfy this condition it follows that changes in load on the main vehicle are sensed by the height control valve and that the air springs are adjusted in response thereto to vary the proportion of the load change assumed by load sharing device 11. If the latter was operating unloaded previously, expansion of the air springs will act automatically to remove any slight play or lost motion between the parts of the hitch assembly to provide a shockless connection between the main vehicle and device 11.

While the particular cargo vehicle with load distributing accessory herein shown and disloseed in detail is fully capable of attaining the objects and providing the advantages hereinbefore stated, it is to be understood that it is merely illustrative of the presently preferred embodiment of the invention and that no limitations are intended to the details of construction or design herein shown other than as defined in the appended claims.

I claim:

1. A load sharing accessory for attachment to the rear end of a cargo vehicle comprising an elongated rigid frame supported at one end on a carriage equipped with air bellows suspension means, means coupling the other end of said rigid frame to the rear end of a cargo vehicle for limited pivotal movement about a vertically elongated axis capable of transferring cargo load forces from said vehicle to said load sharing accessory, and said air bellows suspension means being inflatable sufficiently to assume a share of said cargo load which otherwise would be carried by the rear wheels of the cargo vehicle to which said accessory is coupled.

2. A load sharing accessory for attachment to the rear end of a cargo vehicle of the type having rear supporting carriage wheels, said accessory having an elongated rigid frame, carriage means extending crosswise of the rear end of said frame and including air bellows suspension means inflatable to different pressures interposed between said carriage and said rigid frame, and means including a draft connection for pivotally coupling the forward end of said rigid frame to the rear end of a cargo vehicle in a manner effective to transfer weight from the cargo vehicle onto said accessory.

3. The accessory defined in claim 2 characterized in the provision of a pivoting draft connection between said carriage and a portion of said rigid frame offset lengthwise of said rigid frame from the axis of said carriage.

4. The accessory defined in claim 3 characterized in the provision of load sensor means interposed between said rigid frame and said carriage effective to sense a change in loading on said air bellows and responsive thereto to change the air pressure in said air bellows.

5. In combination, a self-propelled wheeled vehicle having rigid frame means interconnecting forward and rearward pairs of wheels and associated suspension assemblies, load sharing means operatively coupled to one end of said vehicle for assuming a share of the load thereon, said load sharing means having an elongated rigid frame, carriage means including resilient suspension means connected crosswise beneath the end thereof remote from said vehicle, means for coupling the opposite end of said rigid frame to the end of said vehicle at points widely spaced from one another along a vertical pivot axis, and said resilient suspension means being so adjusted relative to said pivot axis and said vehicle that said rigid frame is effective to transfer a predetermined portion of the vehicle load through said rigid frame and onto the carriage of said load sharing means.

6. The combination defined in claim 5 characterized in that said resilient suspension means includes spring beam means connected at one end to said carriage means and movably connected at its other end with a midportion of said rigid frame and providing a pivoting draft connection between said frame and said carriage means, and means on said load sharing means for adjusting the vertical distance between said frame and said carriage in response to changes in load on said self-propelled vehicle and thereby the capability of said load sharing means to share said changes in load.

7. The combination defined in claim 6 characterized in that said resilient suspension means includes adjustable air bellows suspension means and in that said adjusting means includes means for varying the quantity of pressurized air in said air bellows suspension means thereby to vary the load supporting capability thereof.

8. The combination defined in claim 7 characterized in that said adjusting means includes automatic load leveling valve means operable to control the admission of pressurized air to and the bleeding of pressurized air from said air bellows in accordance with changes in load on said self-propelled vehicle whereby said load sharing means automatically adjusts itself to share said change in load on said self-propelled vehicle whenever the load on the vehicle is in excess of a predetermined value.

9. The combination defined in claim 5 characterized in that said means holding said load sharing means coupled to said self-propelled vehicle includes at least one swiveling hitch means at one end of said vertical pivoting axis.

10. The combination defined in claim 5 characterized in that said means holding said load sharing means coupled to said self-propelled vehicle includes one draft transmitting pivoting connection and one nondraft transmitting thrust bearing pivotable to and fro in a limited arc extending crosswise of one end of said vehicle.

11. The combination defined in claim 10 characterized in that said coupling means comprises swiveling hitch means having manually controlled power operated latch means operable to lock said load sharing means positively coupled to said vehicle.

12. The combination defined in claim 5 characterized in that said resilient suspension means includes a pair of spring beams having one end of each connected to an adjacent side of said rigid frame near the midportion thereof and having their midportions connected to an adjacent end of said carriage means, a pair of air bellows interposed between said rigid frame and the other ends of said beams, means for supplying pressurized air to said bellows, and stabilizing shock absorber means having the lower ends thereof connected to said spring beams adjacent the lower end of said air bellows and converging upwardly toward one another to a pivotal connection with the midtransverse portion of said rigid frame.

13. A load sharing accessory for connection to one end of a vehicle frame for limited pivotal movement crosswise of one end of said vehicle to provide the vehicle with a horizontally-swinging load transferring cantilever projecting horizontally from the vehicle end, said accessory comprising a carriage assembly, a rigid frame of generally triangular configuration as viewed from above having its wide end carried by said carriage through draft imparting suspension means including a pair of air bellows, the narrow end of said frame having vertically elongated rigid means for pivotally connecting said accessory to one end of a vehicle for limited swinging movement about an elongated vertical axis and preventing movement of said accessory frame in a vertical plane, and means for supplying controlled quantities of pressurized air to said air bellows to vary the load transferring capability of said accessory relative to a vehicle to which it is coupled.

14. A wheel supported load sharing accessory for use with motor propelled vehicles and adapted to be attached to the rear end thereof to apportion loading action on the rear wheels of the vehicle between the forward wheels of the vehicle and the wheels of said accessory to avoid excessive loading of highways, said accessory comprising an elongated rigid frame having means for coupling the same to the rear end of a vehicle frame of the type supported by wheels crosswise of its opposite ends, said coupling means permitting limited pivotal movement in a horizontal arc while remaining generally rigid with said vehicle longitudinally of the vehicle frame, the wheels of said accessory being connected to the accessory frame by resilient suspension means including adjustable air bellows, and said air bellows being pressurized sufficiently to assume a portion of the load on the rear wheels of said vehicle and to tilt the vehicle frame forwardly about the rear wheels thereof sufficiently to transfer a portion of the weight from said rear wheels to forward ones of said vehicle wheels.

15. The combination defined in claim 14 characterized in the provision of means for sensing the loading on selected ones of said wheels and operable in response to a change in loading thereon to vary the quantity of air in said air bellows thereby to adjust the latter to the sensed loading condition on said selected wheels.

16. The combination defined in claim 15 characterized in that one forward end corner of the frame of said accessory is provided with drawbar hitch means for pivotally and detachably coupling said accessory to the rear of the vehicle frame, and the other forward end corner in vertically offset relation to said one corner is provided with one component of a vertical axis thrust bearing having a complemental pivoting fit with cooperating vertical axis thrust bearing means mounted centrally of the rear end of said vehicle.

References Cited by the Examiner

UNITED STATES PATENTS

| | | | |
|---|---|---|---|
| 2,950,926 | 8/1960 | Rockwell et al. | 280—405 |
| 2,974,976 | 3/1961 | Lyall | 280—405 X |
| 3,093,388 | 6/1963 | Kulyk | 280—81 |
| 3,112,100 | 11/1963 | Prichard. | |
| 3,161,418 | 12/1964 | Brennan et al. | 280—81 |
| 3,191,963 | 6/1965 | Prichard | 280—81 |

LEO FRIAGLIA, *Primary Examiner.*